(12) United States Patent
Jung et al.

(10) Patent No.: US 8,163,207 B2
(45) Date of Patent: Apr. 24, 2012

(54) MICROCAPSULES

(75) Inventors: Marc Rudolf Jung, Worms (DE); Dieter Niederberger, Ludwigshafen (DE); Hans Willax, Maxdorf (DE); Hans-Peter Hentze, Mannheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 5 days.

(21) Appl. No.: 12/444,051

(22) PCT Filed: Oct. 17, 2007

(86) PCT No.: PCT/EP2007/061052
§ 371 (c)(1),
(2), (4) Date: Apr. 2, 2009

(87) PCT Pub. No.: WO2008/046839
PCT Pub. Date: Apr. 24, 2008

(65) Prior Publication Data
US 2009/0289216 A1 Nov. 26, 2009

(30) Foreign Application Priority Data
Oct. 17, 2006 (EP) .................................... 06122419

(51) Int. Cl.
*B01J 13/02* (2006.01)
*C08F 2/32* (2006.01)

(52) U.S. Cl. ......... 264/4.7; 252/79; 510/130; 510/475; 428/402.24; 428/402.21; 428/402.22; 524/801; 427/213.3; 427/213.34

(58) Field of Classification Search .................. 252/79; 510/130, 475; 428/402.24, 402.21, 402.2, 428/402.22; 524/801; 427/212, 213.3, 213.34
See application file for complete search history.

(56) References Cited

U.S. PATENT DOCUMENTS

| | | | | |
|---|---|---|---|---|
| 5,292,835 A | * | 3/1994 | Jahns et al. | 526/73 |
| 5,443,909 A | * | 8/1995 | Mandoh et al. | 428/402.21 |
| 5,596,051 A | * | 1/1997 | Jahns et al. | 526/73 |
| 5,972,508 A | * | 10/1999 | Boeckh et al. | 428/402.2 |
| 6,200,681 B1 | * | 3/2001 | Jahns et al. | 428/402.24 |
| 6,716,526 B2 | * | 4/2004 | Weston et al. | 428/402.2 |
| 6,951,836 B2 | * | 10/2005 | Jahns et al. | 510/441 |
| 7,166,355 B2 | | 1/2007 | Jahns et al. | |
| 7,572,397 B2 | * | 8/2009 | Jahns et al. | 264/4.6 |
| 8,034,887 B2 | * | 10/2011 | Jung | 526/201 |
| 2003/0118822 A1 | * | 6/2003 | Jahns et al. | 428/402.2 |
| 2003/0211796 A1 | * | 11/2003 | Jahns et al. | 442/136 |
| 2004/0234738 A1 | * | 11/2004 | Jahns et al. | 428/221 |
| 2006/0199011 A1 | * | 9/2006 | Jahns | 428/402.24 |
| 2008/0033075 A1 | | 2/2008 | Schmidt et al. | |

FOREIGN PATENT DOCUMENTS

| | | |
|---|---|---|
| DE | 43 21 205 | 1/1995 |
| DE | 197 49 731 | 5/1999 |
| DE | 199 59 806 | 6/2001 |
| DE | 101 39 171 | 2/2003 |
| EP | 0 457 154 | 11/1991 |
| EP | 1251954 | 10/2002 |
| EP | 1 321 182 | 6/2003 |
| JP | 52085985 A * | 7/1977 |
| WO | WO 2004/092299 A1 * | 10/2004 |
| WO | 2005 116559 | 12/2005 |

OTHER PUBLICATIONS

Derwent abstracts JP 52085985 Carbon Paper KK, Jul. 1977.*
Clariant, Mowiol Polyvinyl alcohol, Dec. 1999. "Mowiol_1999_PVA.pdf".*
Aldrich, Mowiol 18-88 "Aldrich_Mowiol_18-88.pdf". obtained online Aug. 26, 2011 from Sigma-Aldrich website.*
U.S. Appl. No. 12/307,926, filed Jan. 8, 2009, Hentze et al.
U.S. Appl. No. 12/744,596, filed May 25, 2010, Jung.
U.S. Appl. No. 12/812,325, filed Jul. 9, 2010, Hantze et al.
U.S. Appl. No. 12/517,360, filed Jun. 3, 2009, Jung et al.

* cited by examiner

*Primary Examiner* — Mark Eashoo
*Assistant Examiner* — Jane L Stanley
(74) *Attorney, Agent, or Firm* — Oblon, Spivak, McClelland, Maier & Neustadt, L.L.P.

(57) ABSTRACT

The invention described herein relates to a method of preparing microcapsules comprising a capsule core, a polymeric capsule wall and also, disposed on the outer surface of the capsule wall, a polyelectrolyte having an average molecular weight in the range from 500 g/mol to 10 million g/mol, the polymeric capsule wall being formed from specified monomers, where the microcapsules have an average particle size of 1.5-2.5 μm and 90% of the particles have a particle size ≦4 μm, by microencapsulating a capsule core with a polymeric capsule wall and then contacting the polymeric capsule wall with one or more polyelectrolytes in water or an aqueous medium.

21 Claims, No Drawings

MICROCAPSULES

The present invention concerns microcapsules comprising a capsule core, a capsule wall and also, disposed on the outer surface of the capsule wall, a polyelectrolyte having an average molecular weight in the range from 500 g/mol to 10 million g/mol, the capsule wall being constructed from 10% to 100% by weight of one or more $C_1$-$C_{24}$-alkyl esters of acrylic and/or methacrylic acid (monomers I), 0% to 80% by weight of a water-insoluble or sparingly water-soluble bi- or polyfunctional monomer (monomers II), and 0% to 90% by weight of other monomers (monomer III)

all based on the total weight of the monomers, wherein the microcapsules have an average particle size of 1.5-2.5 µm and 90% of the particles have a particle size $\leq 4$ µm.

The present invention also concerns a process for their production, their use in textiles, bindered building materials and heat transfer fluids, and also microcapsules as an intermediate product.

Textiles combined with latent heat storage media have been studied as a novel combination of materials in recent years. The working principle of latent heat storage media, often also known as phase change materials (PCMs), relies on the transformation enthalpy which arises during the solid/liquid phase transition and which signifies an absorption of energy or release of energy to the environment. They can consequently be used to keep a temperature constant within a fixed temperature range.

EP-A 1 029 018 teaches the use of microcapsules having a capsule wall of a highly crosslinked methacrylic ester polymer and a latent heat storage core in bindered building materials such as concrete or gypsum. DE-A 101 39 171 describes the use of microencapsulated latent heat storage materials in gypsum plasterboards.

Furthermore, WO 2005/116559 teaches the use of microencapsulated latent heat storage materials in chipboard panels together with melamine-formaldehyde resins as a binder.

It is often advantageous in the building sector to use comparatively large microcapsules, since these are generally lower in dust or are more advantageous to process with other additives. The requirements are different in the textile sector, however. Microcapsules which are to be spun together with fiber dope have to be sufficiently small in order that the fibers do not become brittle and are processible in a spinning operation.

The microcapsular powder taught in EP-A-1 029 018, WO 2005/116559, and DE-A-101 39 171 has average particle sizes in the range of 2-25 µm. The size of the powder particles corresponds to the capsule sizes in the microcapsular dispersions.

EP-A 1 321 182 teaches microencapsulated latent heat storage materials having a capsule wall of a highly crosslinked methacrylic ester polymer and also nominates their use in textiles. This reference teaches microcapsular dispersions having a particularly low fraction of capsules $\leq 4$ µm in particle size.

EP-A 1 251 954 teaches microcapsules based on polymethacrylic acid having particle sizes of 1.2 µm for impregnating fibers. However, small capsules often exhibit insufficient tightnesses, in particular with regard to cleaning agents.

Prior European application No. 06117092.4 teaches polyelectrolyte-modified microcapsules having average particle sizes of 4.7 µm or larger, which exhibit improved durability to dry cleaning in the textile sector.

It is an aspect of the present invention to provide microcapsules having latent heat storage materials as a capsule core that are incorporable in the production of textile fibers.

We have accordingly found the abovementioned microcapsules, a process for their production and their use in textiles, bindered building materials and heat transfer fluids. We have also found microcapsules useful as an intermediate product, a process for their production and also their use.

The microcapsules of the present invention comprise a capsule core and a capsule wall. The capsule core consists predominantly, to more than 95% by weight, of lipophilic substance.

The average particle size of the capsules (Z-average by light scattering) is in the range from 1.5 to 2.5 µm and preferably in the range from 1.7 to 2.4 µm. According to the present invention, 90% of the particles have a particle size (diameter) $\leq 4$ µm, preferably $\leq 3.5$ µm, and in particular $\leq 3$ µm. The full width at half maximum value of the microcapsule dispersion is in the range from 0.2 to 1.5 µm, preferably 0.4 to 1 µm. The weight ratio of capsule core to capsule wall is generally in the range from 50:50 to 95:5. A core/wall ratio in the range from 70:30 to 93:7 is preferred.

According to the present invention, polyelectrolytes are disposed on the outer surface of the capsule wall. Depending on the amount of polyelectrolyte, the polyelectrolyte arrangement on the surface takes the form of points, spots or dots, or takes the form of regions which can extend to where the polyelectrolyte forms a uniform arrangement which resembles a layer, sheath, shell or envelope.

In general, the fraction of polyelectrolyte is in the range from 0.1% to 10% by weight based on the total weight of the polyelectrolyte-bearing microcapsules. Preferably the polyelectrolyte fraction is 0.5%-5% by weight and in particular 1%-3% by weight based on the total weight of the polyelectrolyte-bearing microcapsules.

Different wall thicknesses can be necessary depending on the field of use, so that it can further be sensible to orient the amount of polyelectrolyte on the basis of the total amount of monomers in the wall.

The preferred amount of polyelectrolyte in one embodiment is accordingly in the range from 10% to 30% by weight based on the total amount of the monomers in the wall material.

In another embodiment, the preferred amount of polyelectrolyte is in the range from 5% to 15% by weight based on the total amount of the monomers in the wall material.

The term polyelectrolyte generally refers to polymers having ionizable or ionically dissociable groups which can be a polymer chain constituent or substituent. Typically, the number of these ionizable or ionically dissociable groups in the polyelectrolyte is so large that the polymers are water soluble or swellable in the ionic form (also known as polyions). Preference is given to polyelectrolytes which have a solubility of $\geq 4$ g/l in water at 25° C., in particular polyelectrolytes having unlimited solubility in water. Preference is given to polyelectrolytes that bear an electrolyte functionality on each repeat unit.

Unlike protective colloids, polyelectrolytes generally have little if any emulsifying effect and have predominantly a thickening effect. In the realm of the present invention, polyelectrolytes have an average molecular weight in the range from 500 to 10 000 000 g/mol, preferably in the range from 1000 to 100 000 g/mol and in particular in the range from 1000 to 10 000 g/mol. Linear or branched polyelectrolytes can be used. Unlike protective colloids used in the realm of the present invention, which are added prior to the polymerization to prepare the oil-in-water emulsion, polyelectrolytes for the purposes of the present invention are polymers having ionizable or ionically dissociable groups, which are contacted with the microcapsules—after polymerization has taken place, that is—in an aqueous medium, preferably water. Aqueous medium here refers to aqueous mixtures comprising up to 10% by weight, based on the aqueous medium, of a water-miscible solvent which, in the desired amount to be used, is miscible with water at 25° C. and 1 bar. Such solvents include alcohols such as methanol, ethanol, propanol, isopropanol, glycol, glycerol and methoxyethanol and water-soluble ethers such as tetrahydrofuran and dioxane and also aprotic additives such as dimethylformamide or dimethyl sulfoxide.

Depending on the identity of the dissociable groups, there are cationic and anionic polyelectrolytes (also known as polyions). The charge on the polyion is contemplated, without counter-ion. Cationic polyelectrolytes are formed from polymers comprising basic groups (polybases) by addition of protons or quaternization.

Anionic polyelectrolytes are formed from polymers comprising acidic groups (polyacids) by detachment of protons.

The polyelectrolyte is classified according to the resulting net charge of the polyion (i.e., without counter-ion). When the polyelectrolyte has predominantly positively charged, dissociated groups, it is a cationic polyelectrolyte. When it has predominantly negatively charged groups, it is an anionic polyelectrolyte.

Preference is given to using one or more cationic or one or more anionic polyelectrolytes. Particular preference is given to choosing one or more cationic polyelectrolytes. It is believed that successive addition of a plurality of differently charged polyelectrolytes will lead to the construction of a plurality of layers, provided the amount of polyelectrolyte is in each case sufficient to construct a layer. In general, an amount of at least 1% by weight of polyelectrolyte based on the total weight of the polyelectrolyte-bearing microcapsules will lead to coating with a layer. Preferably, however, only one layer of polyelectrolyte is applied. This layer may comprise one polyelectrolyte or a mixture of a plurality of polyelectrolytes having the same charge.

Anionic polyelectrolytes are obtainable for example by free radical polymerization of ethylenically unsaturated anionic monomers in an aqueous medium. Useful ethylenically unsaturated anionic monomers include for example monoethylenically unsaturated $C_3$- to $C_5$-carboxylic acids such as acrylic acid, methacrylic acid, ethacrylic acid, crotonic acid, maleic acid, fumaric acid and itaconic acid, sulfonic acids such as vinylsulfonic acid, styrenesulfonic acid and acrylamidomethylpropanesulfonic acid and phosphonic acids such as vinylphosphonic acid, and/or the respective alkali metal, alkaline earth metal and/or ammonium salts thereof.

Preferred anionic monomers include acrylic acid, methacrylic acid, maleic acid and acrylamido-2-methylpropanesulfonic acid. Particular preference is given to aqueous dispersions of polymers based on acrylic acid. The anionic monomers can be polymerized either alone, to form homopolymers, or else in admixture with each other, to form copolymers. Examples thereof are the homopolymers of acrylic acid, homopolymers of methacrylic acid or copolymers of acrylic acid and maleic acid, copolymers of acrylic acid and methacrylic acid and also copolymers of methacrylic acid and maleic acid.

However, anionic monomers can also be polymerized in the presence of at least one other ethylenically unsaturated monomer. These monomers can be nonionic or alternatively bear a cationic charge.

Examples of nonionic comonomers are acrylamide, methacrylamide, N-$C_1$- to $C_3$-alkylacrylamides, N-vinylformamide, acrylic esters of monohydric alcohols having 1 to 20 carbon atoms such as in particular methyl acrylate, ethyl acrylate, isobutyl acrylate and n-butyl acrylate, methacrylic esters of monohydric alcohols having 1 to 20 carbon atoms for example methyl methacrylate and ethyl methacrylate, and also vinyl acetate and vinyl propionate.

Useful cationic monomers for copolymerization with anionic monomers include dialkylaminoethyl acrylates, dialkylaminoethyl methacrylates, dialkylaminopropyl acrylates, dialkylaminopropyl methacrylates, dialkylaminoethylacrylamides, dialkylaminoethylmethacrylamides, dialkylaminopropylacrylamides, dialkylaminopropylmethacrylamides, diallyidimethylammonium chloride, vinylimidazole, and also cationic monomers each neutralized and/or quaternized with mineral acids. Specific examples of cationic monomers are dimethylaminoethyl acrylate, dimethylaminoethyl methacrylate, diethylaminoethyl acrylate, diethylaminoethyl methacrylate, dimethylaminopropyl acrylate, dimethylaminopropyl methacrylate, diethylaminopropyl acrylate and diethylaminopropyl methacrylate, dimethylaminoethylacrylamide, dimethylaminoethylmethacrylamide, dimethylaminopropylacrylamide, dimethylaminopropylmethacrylamide, diethylaminoethylacrylamide and diethylaminopropylacrylamide.

Cationic monomers can be completely or else only partially neutralized or quaternized, for example to an extent in each case from 1% to 99%. Dimethyl sulfate is the preferred quaternizing agent for cationic monomers. However, the monomers can also be quaternized with diethyl sulfate or with alkylating agents, in particular alkyl halides such as methyl chloride, ethyl chloride or benzyl chloride. Comonomers for preparing anionic polyelectrolytes are used for example in such amounts that the resulting dispersions of polymer, on diluting with water and at above pH 7.0 and at 20° C., are water soluble and have an anionic charge. Based on total monomers used in the polymerization, the amount of nonionic and/or cationic comonomers is for example in the range from 0% to 99% by weight and preferably in the range from 5% to 75% by weight and is usually in the range from 5% to 25% by weight. Cationic monomers are used at most in an amount such that the resulting polyelectrolytes have a net anionic charge at pH <6.0 and 20° C. The excess anionic charge in the amphoteric polymers formed is for example at least 5 mol %, preferably at least 10 mol %, in particular at least 30 mol % and most preferably at least 50 mol %.

Examples of preferred copolymers are copolymers composed of 25% to 90% by weight acrylic acid and 75% to 10% by weight acrylamide. Preferably, at least one ethylenically unsaturated $C_3$ to $C_5$-carboxylic acid is polymerized in the absence of other monoethylenically unsaturated monomers. Particular preference is given to homopolymers of acrylic acid which are obtainable by free radical polymerization of acrylic acid in the absence of other monomers.

Useful crosslinkers for preparing branched polyelectrolytes include all compounds having at least two ethylenically unsaturated double bonds in the molecule. Such compounds are used for example in the preparation of crosslinked polyacrylic acids such as superabsorbent polymers, cf. EP-A 0 858 478 page 4 line 30 to page 5 line 43. Examples of crosslinkers are triallylamine, pentaerythritol triallyl ether, pentaerythritol tetraallyl ether, methylenebisacrylamide, N,N'-divinylethyleneurea, at least diallyl ethers or at least divinyl ethers of polyhydric alcohols such as for example sorbitol, 1,2-ethanediol, 1,4-butanediol, trimethylolpropane, glycerol, diethylene glycol, and of sugars such as sucrose, glucose, mannose, fully acrylated or methacrylated dihydric alcohols having 2 to 4 carbon atoms such as ethylene glycol dimethacrylate, ethylene glycol diacrylate, butanediol dimethacrylate, butanediol diacrylate, diacrylates or dimethacrylates of polyethylene glycols having molecular weights from 300 to 600, ethoxylated trimethylenepropane triacrylates or ethoxylated trimethylenepropane trimethacrylates, 2,2-bis(hydroxymethyl)butanol trimethacrylate, pentaerythritol triacrylate, pentaerythritol tetraacrylate and triallylmethylammonium chloride. When crosslinkers are used in the preparation of the dispersions of the present invention, the amounts of crosslinker which are used in each case are for example from 0.0005% to 5.0% by weight and preferably from 0.001% to 1.0% by weight, based on total monomers used in the polymerization. Preferred crosslinkers are pentaerythritol triallyl ether, pentaerythritol tetraallyl ether, N,N'-divinylethyleneurea, at least diallyl ethers of sugars such as sucrose, glucose or mannose and triallylamine, and also mixtures thereof.

Useful anionic polyelectrolytes further include polycondensates such as for example phenolsulfonic acid resins. Of suitability are aldehyde condensates, particularly on the basis of formaldehyde, acetaldehyde, isobutyraldehyde, propionaldehyde, glutaraldehyde and glyoxal, and very particularly formaldehyde condensates based on phenolsulfonic acids. Amines and amides, in particular those of carbonic acid such as for example urea, melamine or dicyandiamide are examples of further reacting compounds which can be co-used for preparing the phenolsulfonic acid resins.

The phenolsulfonic acid resins are preferably present as salts. The condensation products of the present invention preferably have a degree of condensation in the range from 1 to 20 and an average molecular weight of 500-10 000 g/mol. The phenolsulfonic acid resins are preferably prepared similarly to the way indicated in EP-A 816 406.

Useful cationic polyelectrolytes include for example polymers from the group of the
(a) polymers comprising vinylimidazolium units,
(b) polydiallyldimethylammonium halides,
(c) polymers comprising vinylamine units,
(d) polymers comprising ethyleneimine units,
(e) polymers comprising dialkylaminoalkyl acrylate and/or dialkylaminoalkyl methacrylate units, and
(f) polymers comprising dialkylaminoalkylacrylamide and/or dialkylaminoalkylmethacrylamide units.

Such polymers are known and commercially available. The monomers underlying the cationic polyelectrolytes of groups a-f can be used for polymerization in the form of the free base, but preferably in the form of their salts with mineral acids such as hydrochloric acid, sulfuric acid or phosphoric acid and also in quaternized form. Useful quaternizing agents include for example dimethyl sulfate, diethyl sulfate, methyl chloride, ethyl chloride, cetyl chloride or benzyl chloride.

Examples of cationic polyelectrolytes are
(a) homopolymers of vinylimidazolium methosulfate and/or copolymers of vinylimidazolium methosulfate and N-vinylpyrrolidone,
(b) polydiallyldimethylammonium chlorides,
(c) polyvinylamines and also partially hydrolyzed polyvinylformamides,
(d) polyethyleneimines
(e) polydimethylaminoethyl acrylate, polydimethylaminoethyl methacrylate, copolymers of acrylamide and dimethylaminoethyl acrylate and copolymers of acrylamide and dimethylaminoethyl methacrylate, for which the basic monomers can also be present in the form of the salts with mineral acids or in quaternized form, and
(f) polydimethylaminoethylacrylamide, polydimethylaminoethylmethacrylamide and copolymers of acrylamide and dimethylaminoethylacrylamide, for which the cationic monomers can also be present in the form of the salts with mineral acids or in quaternized form.

The average molar masses $M_w$ of the cationic polyelectrolytes are at least 500 g/mol. They are for example in the range from 500 g/mol to 10 million g/mol, preferably in the range from 1000 to 500 000 g/mol and usually in the range from 1000 to 5000 g/mol.

Preference for use as cationic polymers is given to
(a) homopolymers of vinylimidazolium methosulfate and/or copolymers of vinylimidazolium methosulfate and N-vinylpyrrolidone having an average molar mass $M_w$ of 500 to 10 000 g/mol in each case,
(b) polydiallyldimethylammonium chlorides having an average molar mass $M_w$ of 1000 to 10 000 g/mol,
(c) polyvinylamines and partially hydrolyzed polyvinylformamides having an average molar mass $M_w$ of 500 to 10 000 g/mol, and
(d) polyethyleneimines having an average molar mass $M_w$ of 500 to 10 000 g/mol.

The copolymers of vinylimidazolium methosulfate and N-vinylpyrrolidone which are mentioned under (a) comprise, for example, from 10% to 90% by weight of N-vinylpyrrolidone incorporated in the form of polymerized units. Instead of N-vinylpyrrolidone, it is possible to use, as a comonomer, at least one compound from the group consisting of the ethylenically unsaturated $C_3$- to $C_5$-carboxylic acids, such as, in particular, acrylic acid or methacrylic acid, or the esters of these carboxylic acids with monohydric alcohols comprising 1 to 18 carbon atoms, such as methyl acrylate, ethyl acrylate, isopropyl acrylate, n-butyl acrylate, isobutyl acrylate, methyl methacrylate, ethyl methacrylate or n-butyl methacrylate.

A preferred polymer of group (b) is polydiallyldimethylammonium chloride. Also suitable are copolymers of diallyldimethylammonium chloride and dimethylaminoethyl acrylate, copolymers of diallyldimethylammonium chloride and dimethylaminoethyl methacrylate, copolymers of diallyldimethylammonium chloride and diethylaminoethyl acrylate, copolymers of diallyldimethylammonium chloride and dimethylaminopropyl acrylate, copolymers of diallyidimethylammonium chloride and dimethylaminoethylacrylamide and copolymers of diallyldimethylammonium chloride and dimethylaminopropylacrylamide. The copolymers of diallyldimethylammonium chloride comprise, for example, from 1 to 50, in general from 2 to 30, mol % of at least one of said comonomers incorporated in the form of polymerized units.

Polymers (c) comprising vinylamine units are obtainable by polymerization of N-vinylformamide, if appropriate in the presence of comonomers, and hydrolysis of the polyvinylformamides with elimination of formyl groups with formation of amino groups. The degree of hydrolysis of the polymers may be, for example, from 1% to 100% and is preferably in the range from 60% to 100%. In the realm of the present application, partially hydrolyzed polyvinylformamides have a degree of hydrolysis of $\geq$50% and preferably of $\geq$90%. The preparation of homo- and copolymers of N-vinylformamide and the hydrolysis of these polymers with formation of polymers comprising vinylamine units are described in detail, for example, in U.S. Pat. No. 6,132,558, column 2, line 36 to column 5, line 25. The statements made there are hereby incorporated by reference in the disclosure of the present invention. Polymers comprising vinylamine units are sold, for example, as Catiofast® and Polymin® brands by BASF Aktiengesellschaft.

Polymers of group (d) which comprise ethyleneimine units, such as polyethyleneimines, are likewise commercial products. They are sold, for example, under the name Polymin® by BASF Aktiengesellschaft, e.g. Polymin® SK. These cationic polymers are polymers of ethyleneimine which are prepared by polymerization of ethyleneimine in an aqueous medium in the presence of small amounts of acids or acid-forming compounds, such as halogenated hydrocarbons, e.g. chloroform, carbon tetrachloride, tetrachloroethane or ethyl chloride, or are condensates of epichlorohydrin and compounds comprising amino groups, such as mono- and polyamines, e.g. dimethylamine, diethylamine, ethylenediamine, diethylenetriamine and triethylenetetramine, or ammonia. They have, for example, molar masses $M_w$ of from 500 to 1 million, preferably from 1000 to 500 000 g/mol.

This group of cationic polymers also includes graft polymers of ethyleneimine on compounds which have a primary or secondary amino group, e.g. polyamidoamines of dicarboxylic acids and polyamines. The polyamidoamines grafted with ethyleneimine can, if appropriate, also be reacted with bifunctional crosslinking agents, for example with epichlorohydrin or bischlorohydrin ethers of polyalkylene glycols.

Suitable cationic polymers of group (e) are polymers comprising dialkylaminoalkyl acrylate and/or dialkylaminoalkyl methacrylate units. These monomers can be used in the form of the free bases but are preferably used in the form of the salts with mineral acids, such as hydrochloric acid, sulfuric acid or phosphoric acid, and in quaternized form in the polymerization. Suitable quaternizing agents are, for example, dimethyl sulfate, diethyl sulfate, methyl chloride, ethyl chloride, cetyl chloride or benzyl chloride. Both homopolymers and copolymers can be prepared from these monomers. Suitable comonomers are, for example, acrylamide, methacrylamide, N-vinylformamide, N-vinylpyrrolidone, methyl acrylate, ethyl acrylate, methyl methacrylate and mixtures of said monomers.

Cationic polymers of group (f) are polymers which comprise dimethylaminoethylacrylamide or dimethylaminoethylmethacrylamide units and which comprise the cationic monomers preferably in the form of the salts with mineral acids or in quaternized form. These may be homopolymers and copolymers. Examples are homopolymers of dimethylaminoethylacrylamide which is completely quaternized with dimethyl sulfate or with benzyl chloride, homopolymers of dimethylaminoethylmethacrylamide which is completely quaternized with dimethyl sulfate, methyl chloride, ethyl chloride or benzyl chloride, and copolymers of acrylamide and dimethylaminoethylacrylamide quaternized with dimethyl sulfate.

In addition to those polycations which are composed solely of cationic monomers, amphoteric polymers may also be used as cationic polymers, provided that they carry a cationic charge overall. The cationic excess charge in the amphoteric polymers is, for example, at least 5 mol %, preferably at least 10 mol %, and is generally in the range from 15 to 95 mol %. Examples of amphoteric polymers having a cationic excess charge are copolymers of acrylamide, dimethylaminoethyl acrylate and acrylic acid which comprise at least 5 mol % more of dimethylaminoethyl acrylate than acrylic acid incorporated in the form of polymerized units, copolymers of vinylimidazolium methosulfate, N-vinylpyrrolidone and acrylic acid which comprise at least 5 mol % more of vinylimidazolium methosulfate than acrylic acid incorporated in the form of polymerized units, hydrolyzed copolymers of N-vinylformamide and of an ethylenically unsaturated $C_3$- to $C_5$-carboxylic acid, preferably acrylic acid or methacrylic acid, having a content of vinylamine units which is at least 5 mol % higher than units of ethylenically unsaturated carboxylic acids, copolymers of vinylimidazole, acrylamide and acrylic acid, the pH being chosen so that at least 5 mol % more vinylimidazole is cationically charged than acrylic acid is incorporated in the form of polymerized units.

Useful polyelectrolytes for the purposes of the present invention further include biopolymers, such as alginic acid, gum arabic, nucleic acids, pectins, proteins, and also chemically modified biopolymers, such as ionic or ionizable polysaccharides, examples being carboxymethylcellulose, chitosan, chitosan sulfate, and ligninsulfonate.

Preference is given to selecting the polyelectrolyte from the group comprising polyacrylic acids, phenolsulfonic acid precondensates, polydiallyldimethylammonium chlorides, polyvinylamines, partially hydrolyzed polyvinylformamides and polyethyleneimine.

One embodiment prefers anionic polyelectrolytes, in particular of polyacrylic acids and phenolsulfonic acid resins.

One embodiment prefers cationic polyelectrolytes, in particular of groups (b), (c) and (d), i.e., polydiallyldimethylammonium chlorides, polyvinylamines and partially hydrolyzed polyvinylformamides and polyethyleneimines. Particular preference is given to using polydiallyldimethylammonium chlorides as cationic polyelectrolytes.

It is believed that the polyelectrolytes accumulate on the electrostatically charged microcapsular wall owing to electrostatic interactions. However, it was observed that not just cationic polyelectrolytes lead to tighter microcapsular walls, but that the addition of anionic polyelectrolytes likewise increases the tightness of the capsular walls. It is believed that these interact with the microcapsular wall via hydrogen bonds or via counter-ions.

The microcapsules of the present invention are obtained by microcapsules comprising a capsule core and a capsule wall constructed from 10% to 100% by weight of one or more $C_1$-$C_{24}$-alkyl esters of acrylic and/or methacrylic acid (monomers I), 0% to 80% by weight of a water-insoluble or sparingly soluble in water bi- or polyfunctional monomer (monomers II), and 0% to 90% by weight of other monomers (monomer III)

all based on the total weight of the monomers, wherein the microcapsules have an average particle size of 1.5-2.5 µm and 90% of the particles have a particle size $\leq 4$ µm, being contacted with one or more polyelectrolytes in water or an aqueous medium. Preferably, a microcapsular dispersions is contacted with one or more polyelectrolytes.

They are preferably obtained in a process wherein a) an oil-in-water emulsion comprising the monomers, the lipophilic substance and polyvinyl alcohol and/or partially hydrolyzed polyvinyl acetate is prepared, the average size of the oil droplets being 1.5-2.5 µm, b) the monomers of the oil-in-water emulsion obtained by a) are free-radically polymerized, and the microcapsules are isolated, if appropriate, c) the microcapsular dispersion or the microcapsules obtained by b) is/are contacted with one or more polyelectrolytes if appropriate in water or an aqueous medium.

The microcapsules of the present invention may if appropriate be subsequently isolated by spray drying. The free-radical polymerization process step b) gives rise to a starting microcapsular dispersion as an intermediate product, which is contacted with the polyelectrolyte in step c). The particle size distribution of the polyelectrolyte-modified microcapsular dispersion is unchanged compared with the starting microcapsular dispersion. Preferably, the microcapsular dispersion obtained from process step b) is contacted with one or more polyelectrolytes, i.e., without intermediate isolation of the microcapsules. Since an aqueous dispersion is present in this case, the desired medium in which the microcapsules and the polyelectrolyte can be contacted is already at hand. Contacting comprises for example mixing with customary stirrers or mixers.

The polyelectrolyte is added to the starting microcapsular dispersion without a solvent or in solution, preferably as an aqueous solution. The amount of polyelectrolyte is in the range from 0.1% to 5% by weight, and preferably in the range from 0.25% to 1.5% by weight, based on the starting quantity of microcapsules.

The capsule wall of the microcapsules is constructed of 10% to 100% by weight and preferably 30% to 99% by weight of one or more $C_1$-$C_{24}$-alkyl esters of acrylic and/or methacrylic acid as monomers I. The polymers may also comprise up to 80% by weight, preferably 1% to 70% by weight, more preferably 5% to 60% by weight and especially 10% to 50% by weight of a bi- or polyfunctional monomer as monomers II, which is insoluble or sparingly soluble in water, in copolymerized form. In addition, the polymers may comprise up to 90% by weight, preferably 0.5% to 50% by weight and especially 1% to 30% by weight of other monomers III in copolymerized form.

Useful monomers I include $C_1$-$C_{24}$-alkyl esters of acrylic and/or methacrylic acid. Methyl acrylate, ethyl acrylate, n-propyl acrylate and n-butyl acrylate and/or the corresponding methacrylates are particularly preferred monomers I. Preference is given to isopropyl acrylate, isobutyl acrylate, sec-butyl acrylate and tert-butyl acrylate and the corresponding methacrylates. Methacrylonitrile must also be mentioned. In general, the methacrylates are preferred.

Useful monomers II include bi- or polyfunctional monomers which are insoluble or sparingly soluble in water, but have good to limited solubility in the lipophilic substance. Sparing solubility is to be understood as meaning a solubility of less than 60 g/l at 20° C. Bi- or polyfunctional monomers are compounds having at least two nonconjugated ethylenic double bonds. Of primary interest are divinyl and polyvinyl monomers which effect crosslinking of the capsular wall during the polymerization.

Preferred bifunctional monomers are the diesters of diols with acrylic acid or methacrylic acid and also the diallyl and divinyl ethers of these diols. Examples are ethanediol diacrylate, divinylbenzene, ethylene glycol dimethacrylate, 1,3-butylene glycol dimethacrylate, methallylmethacrylamide and allyl methacrylate. Particular preference is given to propanediol diacrylate, butanediol diacrylate, pentanediol diacrylate and hexanediol diacrylate or the corresponding methacrylates.

Preferred polyvinyl monomers are trimethylolpropane triacrylate and trimethacrylate, pentaerythritol triallyl ether and pentaerythritol tetraacrylate.

Useful monomers III include other monomers III which differ from the monomers I and II, such as vinyl acetate, vinyl propionate, vinylpyridine and styrene. Particular preference is given to monomers IIIa which bear charge or ionizable groups and differ from the monomers I and II, such as acrylic acid, methacrylic acid, itaconic acid, maleic acid, maleic anhydride, 2-hydroxyethyl acrylate, 2-hydroxyethyl methacrylate, acrylamido 2-methylpropanesulfonic acid, acrylonitrile, methacrylamide, N-vinylpyrrolidone, N-methylolacrylamide, N-methylolmethacrylamide, dimethylaminoethyl methacrylate and diethylaminoethylmethacrylate.

Particular preference is given to an embodiment wherein the capsular wall of the microcapsules is constructed from
30% to 99% by weight of one or more $C_1$-$C_{24}$-alkyl esters of acrylic and/or methacrylic acid as monomers I
1% to 70% by weight, preferably 5% to 60% by weight and especially 10% to 50% by weight of a water-insoluble or sparingly soluble in water bi- or polyfunctional monomer as monomers II,
0.5% to 50% by weight, preferably 1% to 30% by weight, of other monomers IIIa, all based on the total weight of the monomers.

In a further preferred embodiment, the wall-forming polymers are formed from 30% to 90% by weight of methacrylic acid, 10% to 70% by weight of an alkyl ester of (meth)acrylic acid, preferably methyl methacrylate, tert-butyl methacrylate, phenyl methacrylate and cyclohexyl methacrylate, and 0% to 40% by weight of further ethylenically unsaturated monomers. These further ethylenically unsaturated monomers may be the monomers I, II and/or III not hitherto mentioned for this embodiment. Since they in general do not have any significant influence on the microcapsules of this embodiment which are formed, their fraction is preferably <20% by weight and especially <10% by weight. Such monomer compositions and the production of microcapsular dispersions are described in EP-A 1 251 954, expressly incorporated herein by reference.

The microcapsules of the present invention are obtainable via a so-called in situ polymerization. The principle of microcapsule formation is based on a stable oil-in-water emulsion being prepared from the monomers, a free-radical initiator, a protective colloid and the lipophilic substance to be encapsulated. Polymerization of the monomers is then triggered by heating and if appropriate controlled through a further temperature increase, the resulting polymers forming the capsule wall which surrounds the lipophilic substance. This general principle is described for example in DE-A-10 139 171, the content of which is hereby expressly incorporated by reference.

According to the present invention, an oil-in-water emulsion prepared comprises the monomers, the lipophilic substance and polyvinyl alcohol and/or partially hydrolyzed polyvinyl acetate, the average size of the oil droplets being 1.5-2.5 µm (step a). The size of the oil droplets is almost equal to the size of the microcapsules present after the polymerization.

We have found that polyvinyl alcohol and/or partially hydrolyzed polyvinyl acetate when used as protective colloids lead to the microcapsular distributions of the present invention. In general, polyvinyl alcohol or partially hydrolyzed polyvinyl acetate is used in a total amount of at least 3% by weight and preferably in the range from 6% to 8% by weight, based on the microcapsules (without protective colloid). It is possible to add customary protective colloids as mentioned in WO 2005/116559 additionally to the amounts of polyvinyl alcohol or partially hydrolyzed polyvinyl acetate that are preferred according to the present invention.

Preferably, the microcapsules of the present invention are only produced using polyvinyl alcohol and/or partially hydrolyzed polyvinyl acetate and without inclusion of further protective colloids.

Polyvinyl alcohol is obtainable by polymerizing vinyl acetate, if appropriate in the presence of comonomers, and hydrolyzing the polyvinyl acetate to detach the acetyl groups to form hydroxyl groups. The degree of hydrolysis of the polymers can be for example in the range from 1% to 100% and is preferably in the range from 50% to 100% and particularly in the range from 65% to 95%. Partially hydrolyzed polyvinyl acetates herein have a degree of hydrolysis of <50%, while polyvinyl alcohol herein has a degree of hydrolysis of ≧50% to 100%. The synthesis of homo- and copolymers of vinyl acetate and the hydrolysis of these polymers to form polymers comprising vinyl alcohol units is common general knowledge. Polymers comprising vinyl alcohol units are marketed for example as Mowiol® brands by Kuraray Specialities Europe (KSE).

Preference is given to polyvinyl alcohols or partially hydrolyzed polyvinyl acetates whose DIN 53015 viscosity at 20° C. in 4% by weight aqueous solution is in the range from 3 to 56 mPa·s, preferably in the range from 14 to 45 mPa·s and in particular in the range from 22 to 41 mPa·s. Preference is given to polyvinyl alcohols having a degree of hydrolysis of ≧65%, preferably ≧70% and particularly ≧75%.

The present invention's use of polyvinyl alcohol or partially hydrolyzed polyvinyl acetate leads to stable emulsions. This makes it possible to carry out the polymerization, i.e., wall formation, merely by stirring, which merely serves the purpose of better temperature equalization. It is preferable to choose the dispersing conditions for producing the stable oil-in-water emulsion as described in DE-A-10230581. In general, dispersing has to be carried on until the oil droplets have the size of the desired microcapsules, since any size changes during the wall-forming operation are insignificant.

Useful free-radical initiators for the free-radical polymerization reaction include the customary peroxo and azo compounds, advantageously in amounts of 0.2% to 5% by weight, based on the weight of the monomers.

Depending on the physical state of the free-radical initiator and its solubility characteristics, the free-radical initiator can be added as such, but is preferably added as a solution, emulsion or suspension because small quantities in particular of free-radical initiator are metered more precisely.

Preferred free-radical initiators are tert-butyl peroxyneodecanoate, tert-amyl peroxypivalate, dilauroyl peroxide, tert-amyl peroxy-2-ethylhexanoate, 2,2'-azobis-(2,4-dimethyl) valeronitrile, 2,2'-azobis(2-methylbutyronitrile), dibenzoyl peroxide, tert-butyl per-2-ethylhexanoate, di-tert-butyl peroxide, tert-butyl hydroperoxide, 2,5-dimethyl-2,5-di(tert-butylperoxy)hexane and cumene hydroperoxide.

Particularly preferred free-radical initiators are di(3,5,5-trimethylhexanoyl) peroxide, 4,4'-azobisisobutyronitrile, tert-butyl perpivalate and dimethyl 2,2-azobisisobutyrate. These have a half-life of 10 hours in a temperature range from 30 to 100° C.

It is further possible to add customary amounts of conventional regulators such as tert-dodecyl mercaptan or ethylhexyl thioglycolate to the polymerization.

The temperature at which the polymerization is carried out is generally in the range from 20 to 100° C. and preferably in the range from 40 to 95° C. Depending on the desired lipophilic substance, the oil-in-water emulsion is to be formed at a temperature at which the core material is liquid/oily. Accordingly, the free-radical initiator chosen has to have its disintegration temperature above this temperature and the polymerization likewise has to be carried out at from 2 to 50° C. above this temperature, so that free-radical initiators whose disintegration temperature is above the melting point of the lipophilic substance are chosen, if appropriate.

A common process variant for lipophilic substances having a melting point of up to about 60° C. is a reaction temperature starting at 60° C., which is raised to 85° C. in the course of the reaction. Advantageous free-radical initiators have a 10 hour half-life in the range from 45 to 65° C. such as t-butyl perpivalate.

In a further process variant for lipophilic substances having a melting point above 60° C., a temperature program which starts at correspondingly higher reaction temperatures is chosen. Free-radical initiators having a 10 hour half-life in the range from 70 to 90° C. are preferred for initial temperatures of around 85° C. such as t-butyl per-2-ethyl-hexanoate.

The polymerization is conveniently carried out at atmospheric pressure, but can also be carried out at reduced or slightly elevated pressure, for example at a polymerization temperature above 100° C., i.e., in the range from 0.5 to 5 bar, say.

The reaction times for the polymerization are normally in the range from 1 to 10 hours and usually in the range from 2 to 5 hours.

The present process utilizing polyvinyl alcohol and/or partially hydrolyzed polyvinyl acetate makes a simplified method of processing possible. It is thus not necessary—but possible—to disperse at room temperature; instead, dispersion and polymerization can be carried out directly at elevated temperature, dispensing with the need for the otherwise customary controlled first phase of heating up following dispersion.

After the actual polymerization reaction at a conversion of 90% to 99% by weight, it is generally advantageous to render the aqueous microcapsular dispersions largely free of odor carriers, such as residual monomers and other organic volatile constituents. This can be achieved in a manner known per se by physical means by distillative removal (in particular by means of steam distillation) or by stripping with an inert gas. It may also be carried out by chemical means, as described in WO 99/24525, advantageously by redox-initiated polymerization, as described in DE-A 44 35 423, DE-A 44 19 518 and DE-A 44 35 422.

The microcapsules of the present invention are useful, depending on the lipophilic substance, for carbonless copy-paper, in cosmetics, for encapsulating scents, aroma chemicals or adhesives, or in crop protection. The microcapsules of the present invention are particularly useful for latent heat storage materials.

Latent heat storage materials are by definition substances having a phase transition in the temperature range in which heat transfer is to take place. Preferably, the lipophilic substance has a solid/liquid phase transition in the temperature range from −20 to 120° C.

Examples of suitable substances are:
 aliphatic hydrocarbyl compounds such as saturated or unsaturated $C_{10}$-$C_{40}$-hydrocarbons, which are branched or preferably linear, such as n-tetradecane, n-pentadecane, n-hexadecane, n-heptadecane, n-octadecane, n-nonadecane, n-eicosane, n-heneicosane, n-docosane, n-tricosane, n-tetracosane, n-pentacosane, n-hexacosane, n-heptacosane, n-octacosane and cyclic hydrocarbons, e.g. cyclohexane, cyclooctane, cyclodecane;
 aromatic hydrocarbyl compounds, such as benzene, naphthalene, biphenyl, o- or n-terphenyl, $C_1$-$C_{40}$-alkyl-substituted aromatic hydrocarbons, such as dodecylbenzene, tetradecylbenzene, hexadecylbenzene, hexylnaphthalene or decylnaphthalene;
 saturated or unsaturated $C_6$-$C_{30}$-fatty acids, such as lauric, stearic, oleic or behenic acid, preferably eutectic mixtures of decanoic acid with e.g. myristic, palmitic or lauric acid;
 fatty alcohols, such as lauryl, stearyl, oleyl, myristyl, cetyl alcohol, mixtures such as coconut fatty alcohol, and the so-called oxo alcohols which are obtained by hydroformylation of α-olefins and further reactions;

$C_6$-$C_{30}$-fatty amines, such as decylamine, dodecylamine, tetradecylamine or hexadecylamine;

esters such as $C_1$-$C_{10}$-alkyl esters of fatty acids, such as propyl palmitate, methyl stearate or methyl palmitate, and preferably their eutectic mixtures or methyl cinnamate;

natural and synthetic waxes, such as montan acid waxes, montan ester waxes, carnauba wax, polyethylene wax, oxidized waxes, polyvinyl ether wax, ethylene vinyl acetate wax or hard waxes in accordance with Fischer-Tropsch processes;

halogenated hydrocarbons, such as chloroparaffin, bromooctadecane, bromopentadecane, bromononadecane, bromoeicosane, bromodocosane.

Mixtures of these substances are also suitable provided the melting point is not lowered outside of the desired range, or the heat of fusion of the mixture is too low for sensible application.

For example, the use of pure n-alkanes, n-alkanes with a purity greater than 80% or of alkane mixtures as are produced as technical-grade distillate and as such are commercially available is advantageous.

In addition, it may be advantageous to add to the lipophilic substances compounds which are soluble therein in order to prevent the freeze point depression which sometimes arises with nonpolar substances. As described in U.S. Pat. No. 5,456,852 it is advantageous to use compounds with a melting point at from 20 to 120 K higher than the actual core substance. Suitable compounds are the fatty acids, fatty alcohols, fatty amides and aliphatic hydrocarbyl compounds mentioned above as lipophilic substances. They are added in amounts of from 0.1% to 10% by weight, based on the capsule core.

The latent heat storage materials are chosen according to the temperature range in which the heat storage media are desired. For example, for heat storage media in building materials in a moderate climate, preference is given to using latent heat storage materials whose solid/liquid phase transition is in the temperature range from 0 to 60° C. Thus, for interior applications, individual materials or mixtures with conversion temperatures of from 15 to 30° C. are usually chosen. In the case of solar applications as storage medium or for avoiding the overheating of transparent thermal insulation, as described in EP-A 333 145, conversion temperatures of 30-60° C. are especially suitable. Conversion temperatures of 0 to 40° C. are advantageous for applications in the textile sector in particular and of −10 to 120° C. for heat transfer fluids in particular.

Preferred latent heat storage materials are aliphatic hydrocarbons, particularly preferably those listed above by way of example. Particular preference is given to aliphatic hydrocarbons having 14 to 20 carbon atoms, and mixtures thereof.

The present invention further provides microcapsules comprising a capsule core and a capsule wall constructed from 10% to 100% by weight of one or more $C_1$-$C_{24}$-alkyl esters of acrylic and/or methacrylic acid (monomers I), 5% to 60% by weight of a water-insoluble or sparingly water-soluble bi- or polyfunctional monomer (monomers II), and 0% to 85% by weight of monomers (monomer III), the microcapsules having an average particle size of 1.5-2.5 μm and 90% of the particles having a particle size ≦4 μm, preferably ≦3.5 μm and especially ≦3 μm, as an intermediate product. The full width at half maximum value of the microcapsular dispersion is 0.2 to 1.5 μm preferably 0.4 to 1 μm. The intermediate product is obtained according to the process described above. The resulting present invention aqueous dispersions of the microcapsules permit conversion of the microcapsules without further intermediate isolation to the electrolyte-bearing microcapsules of the present invention. In addition, the intermediate product itself has advantageous properties in some applications of microencapsulated latent heat storage materials.

The microcapsular powder of the present invention has diverse uses. It is very useful for modifying fibers and textile articles of manufacture, for example textile wovens and nonwovens (batts for example) etc. Useful application forms here include in particular microcapsular coatings, foams with microcapsules and microcapsule-modified textile fibers. For coatings, the microcapsules are applied to a textile article of manufacture together with a polymeric binder and if appropriate other auxiliary materials, generally as a dispersion. Customary textile binders are film-shaping polymers having a glass transition temperature in the range from −45 to 45° C. preferably −30 to 12° C. The production of such microcapsular coatings is described for example in WO 95/34609, expressly incorporated by reference. The modification of foams with microcapsules is effected in a similar manner as described in DE 981576T and U.S. Pat. No. 5,955,188. The prefoamed substrate, preferably a polyurethane or polyether, is surface treated with a binder-containing microcapsular dispersion. The binder-microcapsule mixture is subsequently brought, by application of reduced pressure, into the open-cell foam structure in which the binder cures and binds the microcapsules to the substrate. A further processing possibility is to modify the textile fibers themselves, as by spinning from a melt or an aqueous dispersion as described in US 2002/0054964 for example. Melt spinning processes are employed for nylon fibers, polyester fibers, polypropylene fibers and similar fibers, whereas the wet spinning process is utilized for the production of acrylic fibers in particular.

The microcapsular powder of the present invention has good durability to dry cleaning.

A further broad field of application is that of bindered building materials comprising mineral, silicatic or polymeric binders. A distinction is made between shaped articles and coating compositions. They are notable for their hydrolytic stability to the aqueous and often alkaline aqueous materials.

The term mineral shaped article refers to a shaped article formed, after shaping, from a mixture of a mineral binder, water, aggregates and also, if appropriate, auxiliaries by the hardening of the mineral binder/water mixture as a function of time, with or without the action of elevated temperature. Mineral binders are common knowledge. They comprise finely divided inorganic substances such as lime, gypsum, clay, loam and/or cement, which are converted to their ready-to-use form by pasting with water and in this form, when left to themselves, undergo consolidation as a function of time to a stonelike mass in air or even under water, with or without the action of elevated temperature.

The aggregates consist in general of granular or fibrous natural or synthetic rock (gravel, sand, glass fibers or mineral fibers) or else, in special cases, of metals or organic aggregates or of mixtures thereof, having grain sizes or fiber lengths in each case adapted to the intended application in a conventional manner. In many cases, chromatic pigments are also used as aggregates for coloring purposes.

Useful auxiliaries include in particular those substances which hasten or delay hardening or which influence the elasticity or porosity of the consolidated mineral shaped article. In particular, they are polymers known for example from U.S. Pat. No. 4,340,510, GB patent 1 505 558, U.S. Pat. Nos.

3,196,122, 3,043,790, 3,239,479, DE-A 43 17 035, DE-A 43 17 036, JP-A 91/131 533 and other references.

The present invention's polyelectrolyte-modified microcapsules and also their unmodified intermediate product are suitable for modifying mineral bindered building materials (mortarlike preparations) comprising a mineral binder which consists of from 70% to 100% by weight cement and 0% to 30% by weight gypsum. This holds in particular when cement is the sole mineral binder. The effect of the present invention is essentially independent of the type of cement. Depending on the project planned, therefore, it is possible to use blast furnace cement, oil shale cement, Portland cement, hydrophobicized Portland cement, quick-setting cement, high-expansion cement or high-alumina cement, the use of Portland cement proving to be particularly favorable. For further details reference may be made to DE-A 196 23 413. Typically, the dry compositions of mineral bindered building materials comprise from 0.1% to 20% by weight of microcapsules, based on the amount of mineral binder.

The present invention's polyelectrolyte-modified microcapsules and also their unmodified intermediate product are preferably incorporated in mineral coating compositions such as render. A render of this kind for the interior sector is typically composed of gypsum as binder. The weight ratio of gypsum/microcapsule is generally in the range from 95:5 to 70:30. Higher microcapsular fractions are possible of course.

Coatings for the exterior sector such as exterior facings or moist environments may comprise cement (cementitious renders), lime or waterglass (mineral or silicate renders) or polymeric dispersions (synthetic-resin renders) as a binder together with fillers and, if appropriate, pigments for coloration. The fraction of total solids accounted for by the microcapsules corresponds to the weight ratios for gypsum renders.

The present invention's polyelectrolyte-modified microcapsules and also their unmodified intermediate product are further useful as additive in polymeric shaped articles or polymeric coating compositions. By these are meant thermoplastic and thermoset plastics materials whose processing does not entail destruction of the microcapsules. Examples are epoxy, urea, melamine, polyurethane and silicone resins and also coating materials—solventbornes, high solids, powder coatings or waterbornes—and dispersion films. The microcapsular powder is also suitable for incorporation in polymeric foams and fibers. Examples of foams are polyurethane foam, polystyrene foam, latex foam and melamine resin foam.

The present invention's polyelectrolyte-modified microcapsules and also their unmodified intermediate product are further useful as additive in lignocellulosic shaped articles such as chipboard.

Advantageous effects can further be achieved if the present invention's polyelectrolyte-modified microcapsules and also their unmodified intermediate product are processed in mineral shaped articles which are subjected to foaming.

The present invention's polyelectrolyte-modified microcapsules and also their unmodified intermediate product are further useful for modifying gypsum plasterboard. Microcapsular powder is incorporated in an amount which is preferably in the range from 5% to 40% by weight and in particular in the range from 20% to 35% by weight based on the total weight of the gypsum plasterboard (dry matter). The production of gypsum plasterboard comprising microencapsulated latent heat storage media is common knowledge and described in EP-A 1 421 243, expressly incorporated herein by reference. Instead of cellulose-based card it is also possible to use alternative, fibrous structures as bothsided covers for the "gypsum plasterboard". Alternative materials are polymeric fibers composed for example of polypropylene, polyester, polyamide, polyacrylates, polyacrylonitrile and the like. Glass fibers are suitable as well. The alternative materials can be employed as wovens and as nonwovens. Such building boards are known for example from U.S. Pat. Nos. 4,810,569, 4,195,110 and 4,394,411.

The present invention's polyelectrolyte-modified microcapsules and also their unmodified intermediate product are further useful for producing heat transfer fluid. Heat transfer fluid herein refers not only to fluids for heat transport but also to fluids for cold transport, i.e., cooling fluids. The principle of the transfer of thermal energy is the same in the two cases and only differs in the direction of transfer.

The examples which follow illustrate the invention. The percentages in the examples are by weight unless stated otherwise.

The particle size of the microcapsular powder was determined using a 3600E Malvern Particle Sizer in accordance with a standard method of measurement which is documented in the literature. Full width at half maximum (FWHM) is to be understood as meaning the width of the distribution at half height of the maximum. The D(0.9) value says that 90% of the particles have a particle size (by volume average) of not more than this value. The D(0.1) value says that 10% of the particles have a particle size (by volume average) up to this value. Correspondingly, D(0.5) means that 50% of the particles have a particle size (by volume average) of not more than this value. The span value is the quotient of the difference (D(0.9)-D(0.1)) and D(0.5).

Determination of Evaporation Rate

By way of pretreatment, 2 g of the microcapsular dispersion were dried in a metal dish at 105° C. for two hours to remove any residual water. Then, the weight ($m_o$) was determined. After one hour of heating at 180° C. and cooling, the weight is redetermined ($m_1$). The weight difference ($m_0$-$m_1$) based on $m_0$ is the evaporation rate.

Production of Microcapsular Dispersion

EXAMPLE 1

Without Polyelectrolyte

Aqueous Phase
330 g of water
220 g of a 10% by weight aqueous polyvinyl alcohol solution (having a DIN 53015 viscosity at 20° C. of 40 mPa·s for a 4% by weight solution and a degree of hydrolysis of 88%; Mowiol 40-88 from Kuraray Specialities Europe (KSE)),
4.4 g of decanoic acid
Oily Phase
440 g of paraffin of melting point 62 to 64° C.
58.2 g of methyl methacrylate
19.4 g of butanediol diacrylate
0.8 g of ethylhexyl thioglycolate
Addition 1
0.92 g of a 75% by weight solution of tert-butyl perpivalate in aliphatic hydrocarbons,
Addition 2
7.63 g of a 10% by weight aqueous solution of tert-butyl hydroperoxide
Feed Stream 1
28.34 g of a 1.1% by weight aqueous solution of ascorbic acid
a) At 70° C. the above aqueous phase was introduced as initial charge and admixed with the oily phase and subsequently dispersed with a high-speed dissolver stirrer at 6000 rpm. Dispersing for 40 minutes gave a stable emulsion of average particle size D[4,3]=1.9 µm.

b) Addition 1 was added and the emulsion was maintained at a temperature of 70° C. for 60 minutes while being stirred at 2500 rpm. Then, the emulsion was heated to a temperature of 85° C. over a period of 60 minutes and maintained at 85° C. for a further hour. Addition 2 was added and the resulting microcapsular dispersion was cooled down to 20° C. with stirring in the course of 30 minutes, while feed stream 1 was added.

The resulting microcapsular dispersion had a solids content of 49% and an average particle size of D[4,3]=1.94 μm (measured using Fraunhofer diffraction). The full width at half maximum value of the distribution was 0.65 μm, D(0.9)=2.26 and the evaporation rate was 4.2%.

EXAMPLE 2

Without Polyelectrolyte a) A mixture of 309 g of a 10% by weight aqueous polyvinyl alcohol solution (Mowiol 40-88), 2.1 g of a 2.5% by weight aqueous solution of sodium nitrite and 250 g of water was introduced as initial charge. This aqueous phase was admixed with a mixture of 431 g of technical grade octadecane (91% purity), 9 g of Sasolwax 6805 (high-melting paraffin from Sasol Wax), 50.4 g of methyl methacrylate, 19.4 g of butanediol diacrylate, 7.8 g of methacrylic acid, 0.76 g of ethylhexyl thioglycolate and 0.7 g of a 75% by weight solution of tert-butyl perpivalate in aliphatic hydrocarbons by metered addition and dispersion with a high-speed dissolver stirrer at 4000 rpm. Dispersing for 40 minutes gave a stable emulsion of average particle size D [4,3]=2.36 μm (diameter).

b) Then, 250 g of water were added, and the emulsion, while being stirred with an anchor stirrer, was heated to 70° C. over 60 minutes, heated to 85° C. in the course of a further 60 minutes and maintained at 85° C. for one hour. Then, 5.38 g of a 10% by weight aqueous tert-butyl hydroperoxide solution were added and the resulting microcapsular dispersion was cooled down to 20° C. with stirring in the course of 30 minutes, while 28.3 g of a 1.1% by weight aqueous ascorbic acid solution was added. Additionally added were 2.00 g of 25% by weight aqueous sodium hydroxide solution, 1.43 g of water and 5.03 g of a 30% by weight aqueous thickener solution (Viscalex HV 30), to prevent creaming of the dispersion.

The resulting microcapsular dispersion had a solids content of 40% and an average particle size of D[4,3]=2.36 μm (measured using Fraunhofer diffraction), D(0.9)=2.88 μm, the full width at half maximum value of the distribution was 0.68 μm, the span was 0.39 and the evaporation rate was 7.0%.

EXAMPLE 3

Without Polyelectrolyte a) A mixture of 206 g of a 10% by weight aqueous polyvinyl alcohol solution (Mowiol 15-79), 2.1 g of a 2.5% by weight aqueous solution of sodium nitrite and 350 g of water was introduced as initial charge. This aqueous phase was admixed with a mixture of 431 g of technical grade octadecane (91% purity), 9 g of Sasolwax 6805 (high-melting paraffin), 31.9 g of methyl methacrylate, 12.3 g of butanediol diacrylate, 4.9 g of methacrylic acid, 0.76 g of ethylhexyl thioglycolate and 0.7 g of a 75% by weight solution of tert-butyl perpivalate in aliphatic hydrocarbons by metered addition and dispersion with a high-speed dissolver stirrer at 6000 rpm. Dispersing for 60 minutes gave a stable emulsion of average particle size D[4,3]=2.57 μm.

b) Then, 150 g of water and 103 g of a 10% by weight aqueous polyvinyl alcohol solution (Mowiol 15-79) were added. The emulsion, while being stirred with an anchor stirrer, was heated to 70° C. over 60 minutes, heated to 85° C. in the course of a further 60 minutes and maintained at 85° C. for one hour. Then, 5.38 g of a 10% by weight aqueous tert-butyl hydroperoxide solution were added and the resulting microcapsular dispersion was cooled down to 20° C. with stirring in the course of 30 minutes, while 28.3 g of a 1.1% by weight aqueous ascorbic acid solution was added to adjust the pH to 7.

The resulting microcapsular dispersion had a solids content of 39% and an average particle size of D[4,3]=1.98 μm (measured using Fraunhofer diffraction), D(0.9)=2.34 μm, the full width at half maximum value of the distribution was 0.55 μm, the span was 0.35 and the evaporation rate was 35.7%.

EXAMPLE 4

Without Polyelectrolyte

Aqueous Phase 425 g of water 412 g of a 10% by weight aqueous polyvinyl alcohol solution (Mowiol 40-88), 2.1 g of a 2.5% by weight aqueous sodium nitrite solution Oily Phase 431 g of technical grade octadecane, (purity 91%)

9 g Sasolwax 6805 high-melting paraffin 50.4 g of methyl methacrylate 19.4 g of butanediol diacrylate 7.8 g of methacrylic acid 0.76 g of ethylhexyl thioglycolate 0.7 g of a 75% by weight solution of tert-butyl perpivalate in aliphatic hydrocarbons Addition 1

5.38 g of a 10% by weight aqueous solution of tert-butyl hydroperoxide

Feed Stream 1

28.3 g of a 1.1% by weight aqueous solution of ascorbic acid

Addition 2

1.00 g of a 25% aqueous sodium hydroxide solution 1.43 g of water a) At 40° C. the above aqueous phase was introduced as initial charge and admixed with the oily phase and subsequently dispersed with a high-speed dissolver stirrer at 6000 rpm. Dispersing for 40 minutes gave a stable emulsion of average particle size D[4,3]=1.96 μm diameter.

b) The emulsion, while being stirred with an anchor stirrer, was heated to 70° C. over 60 minutes and heated to 85° C. in the course of a further 60 minutes. The mixture was then maintained at 85° C. for one hour. Addition 1 was added and the resulting microcapsular dispersion was cooled down to 20° C. with stirring in the course of 30 minutes, while feed stream 1 was added. Addition 2 was added to adjust the pH to 7.

The resulting microcapsular dispersion had a solids content of 40% and an average particle size of D[4,3]=2.17 μm (measured using Fraunhofer diffraction), D(0.9)=2.64 μm, the full width at half maximum value of the distribution was 0.58 μm, the span was 0.42 and the evaporation rate was 21.4%.

EXAMPLE 5

With Polyelectrolyte 100 g of the microcapsular dispersion obtained according to Example 4 (solids content 40% by weight) was subsequently admixed with 2 g of a 20% by weight aqueous solution of a phenolsulfonic acid polycondensate (Tamol® DN, from BASF Aktiengesellschaft) by stirring. The evaporation rate was only 3.6% for an unchanged particle size distribution compared with Example 4.

EXAMPLE 6

With Polyelectrolyte 100 g of the microcapsular dispersion obtained according to Example 4 (solids content 40% by weight) was subsequently admixed with 1.33 g of a 30% aqueous solution of a poly(N,N-diallyl-N,N-dimethylammonium chloride)-based cationic polymer having an ISO 2555 viscosity of 500 mpa★s (Catiofast® CS, from BASF Aktiengesellschaft) by stirring. The evaporation rate was only 5.8% for an unchanged particle size distribution compared with Example 4.

EXAMPLE 7

Without Polyelectrolyte

Aqueous Phase
425 g of water
412 g of a 10% by weight aqueous polyvinyl alcohol solution (Mowiol 40-88),
2.1 g of a 2.5% by weight aqueous sodium nitrite solution
Oily Phase
431 g of technical grade octadecane, (purity 91%)
9 g Sasolwax 6805 high-melting paraffin
50.4 g of methyl methacrylate
19.4 g of butanediol diacrylate
7.8 g of methacrylic acid
0.76 g of ethylhexyl thioglycolate
0.7 g of a 75% by weight solution of tert-butyl perpivalate in aliphatic hydrocarbons
Addition 1
5.38 g of a 10% by weight aqueous solution of tert-butyl hydroperoxide,
Feed Stream 1
28.3 g of a 1.1% by weight aqueous ascorbic acid solution
Addition 2
1.00 g of a 25% aqueous sodium hydroxide solution
1.43 g of water
a) At 70° C. the above aqueous phase was introduced as initial charge and admixed with the oily phase and subsequently dispersed with a high-speed dissolver stirrer at 6000 rpm. Dispersing for 40 minutes gave a stable emulsion of average particle size D[4,3]=2.3 μm diameter.
b) The emulsion was maintained at a temperature of 70° C. for 60 minutes while being stirred with an anchor stirrer. Then, the emulsion was heated to a temperature of 85° C. over a further period of 60 minutes and maintained at 85° C. for a further hour. Addition 1 was added and the resulting microcapsular dispersion was cooled down to 20° C. with stirring in the course of 30 minutes, while feed stream 1 was added. Addition 2 was added to adjust the pH to 7.

The resulting microcapsular dispersion had a solids content of 40% and an average particle size of D[4,3]=2.25 μm (measured using Fraunhofer diffraction), D(0.9)=2.55 μm, the full width at half maximum value of the distribution was 0.68 μm, the span was 0.26 and the evaporation rate was 9.6%.

EXAMPLE 8

Without Polyelectrolyte

Aqueous Phase
437 g of water
12 g of a 32% by weight ionic emulsifier (Disponil® FES77, from Cognis)
412 g of a 10% by weight aqueous polyvinyl alcohol solution (Mowiol 40-88), 10% in water
2.1 g of a 2.5% by weight aqueous sodium nitrite solution
Oily Phase
431 g of technical grade octadecane, (purity 91%)
9 g Sasolwax 6805 high-melting paraffin
50.4 g of methyl methacrylate
19.4 g of butanediol diacrylate
7.8 g of methacrylic acid
0.76 g of ethylhexyl thioglycolate
0.7 g of a 75% by weight solution of tert-butyl perpivalate in aliphatic hydrocarbons
Addition 1
5.38 g of a 10% by weight aqueous solution of tert-butyl hydroperoxide
Feed Stream 1
28.3 g of a 1.1% by weight aqueous ascorbic acid solution
Addition 2
1.50 g of 25% by weight aqueous sodium hydroxide solution
1.43 g of water
a) At 40° C. the above aqueous phase was introduced as initial charge and admixed with the oily phase and subsequently dispersed with a high-speed dissolver stirrer at 6000 rpm. Dispersing for 40 minutes gave a stable emulsion of average particle size D[4,3]=1.81 μm diameter.
b) The emulsion was brought to a temperature of 70° C. over the course of 60 minutes while being stirred with an anchor stirrer. Then, the emulsion was heated to a temperature of 85° C. over a further period of 60 minutes and maintained at 85° C. for a further hour. Addition 1 was added and the resulting microcapsular dispersion was cooled down to 20° C. with stirring in the course of 30 minutes, while feed stream 1 was added. Addition 2 was added to adjust the pH to 7.

The resulting microcapsular dispersion had a solids content of 40% and an average particle size of D[4,3]=1.88 μm (measured using Fraunhofer diffraction), D(0.9)=2.15, the full width at half maximum value of the distribution was 0.65 μm, the span was 0.28 and the evaporation rate was 15.3%.

EXAMPLE 9

Without Polyelectrolyte

Aqueous Phase
437 g of water
1 g of an ionic emulsifier (Tween 20)
412 g of a 10% by weight aqueous polyvinyl alcohol solution (Mowiol 40-88),
2.1 g of a 2.5% by weight aqueous sodium nitrite solution
Oily Phase
431 g of technical grade octadecane, (purity 91%)
9 g Sasolwax 6805 high-melting paraffin
50.4 g of methyl methacrylate
19.4 g of butanediol diacrylate
7.8 g of methacrylic acid 0.76 g of ethylhexyl thioglycolate
0.7 g of a 75% by weight solution of tert-butyl perpivalate in aliphatic hydrocarbons
Addition 1
5.38 g of a 10% by weight aqueous solution of tert-butyl hydroperoxide,
Feed Stream 1
28.3 g of a 1.1% by weight aqueous solution of ascorbic acid
Addition 2
1.00 g of a 25% aqueous sodium hydroxide solution
1.43 g of water
a) At 40° C. the above aqueous phase was introduced as initial charge and admixed with the oily phase and subsequently dispersed with a high-speed dissolver stirrer at 6000 rpm. Dispersing for 40 minutes gave a stable emulsion of average particle size D[4,3]=2.09 μm diameter.
b) The emulsion was brought to a temperature of 70° C. over the course of 60 minutes while being stirred with an anchor stirrer. Then, the emulsion was heated to a temperature of 85° C. over a further period of 60 minutes and maintained at 85° C. for a further hour. Addition 1 was added and the resulting microcapsular dispersion was cooled down to 20° C. with stirring in the course of 30 minutes, while feed stream 1 was added. Addition 2 was added to adjust the pH to 7.

The resulting microcapsular dispersion had a solids content of 40% and an average particle size of D[4,3]=2.08 μm (measured using Fraunhofer diffraction), D(0.9)=2.45 μm, the full width at half maximum value of the distribution was 0.71 μm, the span was 0.36 and the evaporation rate was 12.2%.

EXAMPLE 10

Without Polyelectrolyte, Not Inventive

Aqueous Phase
380 g of water
190 g of a 5% by weight aqueous dispersion of methylhydroxypropylcellulose (Culminal® MHPC 100)
47.5 g of a 10% by weight aqueous polyvinyl alcohol solution (Mowiol 15-79)
2.1 g of a 2.5% by weight aqueous sodium nitrite solution
Oily Phase
431 g of technical grade octadecane, (91% purity)
9 g of Sasolwax 6805 high-melting paraffin
19.6 g of methyl methacrylate
19.6 g of butanediol diacrylate
9.8 g of methacrylic acid
0.7 g of a 75% by weight solution of tert-butyl perpivalate in aliphatic hydrocarbons
Addition 1
5.38 g of a 10% by weight aqueous solution of tert-butyl hydroperoxide
Feed Stream 1
28.3 g of a 1.1% by weight aqueous solution of ascorbic acid
a) At 40° C. the above aqueous phase was introduced as initial charge and admixed with the oily phase and subsequently dispersed with a high-speed dissolver stirrer at 6000 rpm. Dispersing for 40 minutes gave a stable emulsion of average particle size D[4,3]=3.6 μm diameter.
b) The emulsion was heated to a temperature of 70° C. for 60 minutes while being stirred with an anchor stirrer. Then, the emulsion was heated to a temperature of 85° C. over a further period of 60 minutes and maintained at 85° C. for an hour. Addition 1 was added and the resulting microcapsular dispersion was cooled down to 20° C. with stirring in the course of 30 minutes, while feed stream 1 was added.

The resulting microcapsular dispersion had a solids content of 44% and an average particle size of D[4,3]=3.5 μm (measured using Fraunhofer diffraction), D(0.9)=5.67 μm, the full width at half maximum value of the distribution was 2.8 μm, the span was 1.33 and the evaporation rate was 3.8%.

We claim:

1. Isolated microcapsules comprising a capsule core, a polymeric capsule wall and, disposed on the outer surface of the polymeric capsule wall, a polyelectrolyte having an average molecular weight in the range from 500 g/mol to 10 million g/mol, wherein
   (1) the polymeric capsule wall contains units obtained by the polymerization of the following monomers:
      10% to 100% by weight of at least one $C_1$-$C_{24}$-alkyl ester of acrylic and/or methacrylic acid,
      0% to 80% by weight of a water-insoluble or sparingly water-soluble bi- or polyfunctional monomer, and
      0% to 90% by weight of other monomers,
      all based on the total weight of the monomers,
   (2) the microcapsules contain from 0.1% to 10% by weight of the polyelectrolyte based on the total weight of the microcapsules,
   (3) the microcapsules have an average particle size of 1.5-2.5 μm, and
   (4) 90% of the microcapsules have a particle size $\leq 4$ μm.

2. The microcapsules of claim 1, which are obtained by a method comprising:
   (a) microencapsulating a capsule core with a polymeric capsule wall by the polymerization of the following monomers:
      (i) 10% to 100% by weight of one or more $C_1$-$C_{24}$-alkyl ester of acrylic and/or methacrylic acid,
      (ii) 0% to 80% by weight of a water-insoluble or sparingly water-soluble bi- or polyfunctional monomer, and
      (iii) 0% to 90% by weight of other monomers,
      all based on the total weight of the monomers,
   to produce microcapsules;
   followed by
   (b) adding to the microcapsules in an aqueous medium the polyelectrolyte.

3. The microcapsules of claim 1, which are obtained by a method comprising:
   (a) microencapsulating a capsule core with a polymeric capsule wall by the polymerization of the following monomers:
      (i) 10% to 100% by weight of one or more $C_1$-$C_{24}$-alkyl ester of acrylic and/or methacrylic acid,
      (ii) 0% to 80% by weight of a water-insoluble or sparingly water-soluble bi- or polyfunctional monomer, and (iii) 0% to 90% by weight of other monomers,
      all based on the total weight of the monomers,
   to produce microcapsules;
   followed by
   (b) adding to the microcapsules in an aqueous medium the polyelectrolyte, and then
   (c) drying the microcapsules.

4. The microcapsules of claim 1, wherein the polyelectrolyte comprises at least one cationic polyelectrolyte.

5. The microcapsules of claim 1, wherein the capsule core is a lipophilic substance having a solid/liquid phase transition in the temperature range from −20 to 120° C.

6. The microcapsules of claim 1, wherein the polyelectrolyte is polymeric and has ionizable or ionically dissociable groups.

7. The microcapsules of claim 1, wherein the polymeric polyelectrolyte is water soluble or swellable in ionic form.

8. The microcapsules of claim 1, which contain from 0.5% to 5% by weight of the polyelectrolyte based on the total weight of the microcapsules.

9. The microcapsules of claim 1, which have an average particle size of 1.7-2.4 µm.

10. The microcapsules of claim 1, wherein 90% of the microcapsules have a particle size ≦3.5 µm.

11. The microcapsules of claim 1, wherein 90% of the microcapsules have a particle size ≦3 µm.

12. The microcapsules of claim 1, wherein the full width at half maximum value of the microcapsule dispersion is 0.2 to 1.5.

13. The microcapsules of claim 1, wherein the full width at half maximum value of the microcapsule dispersion is 0.4 to 1.0.

14. The microcapsules of claim 1, wherein the weight ratio of the capsule core to the capsule wall is 50:50 to 95:5.

15. The microcapsules of claim 1, wherein the weight ratio of the capsule core to the capsule wall is 70:30 to 93:7.

16. A textile having incorporated therein the microcapsules of claim 1.

17. A bindered building material comprising the microcapsules of claim 1.

18. A heat transfer fluid comprising a dispersion of the microcapsules of claim 1.

19. A method of preparing microcapsules,
wherein the microcapsules comprise a capsule core, a polymeric capsule wall and, disposed on the outer surface of the polymeric capsule wall, a polyelectrolyte having an average molecular weight in the range from 500 g/mol to 10 million g/mol, wherein
(1) the polymeric capsule wall is formed from units obtained by the polymerization of the following monomers:
10% to 100% by weight of at least one $C_1$-$C_{24}$-alkyl ester of acrylic and/or methacrylic acid,
0% to 80% by weight of a water-insoluble or sparingly water-soluble bi- or polyfunctional monomer, and
0% to 90% by weight of other monomers,
all based on the total weight of the monomers,
(2) the microcapsules contain from 0.1% to 10% by weight of the polyelectrolyte based on the total weight of the microcapsules,
(3) the microcapsules have an average particle size of 1.5-2.5 µm, and
(4) 90% of the microcapsules have a particle size ≦4 µm, comprising:
(a) microencapsulating a capsule core with a polymeric capsule wall formed from the polymerization of the following monomers:
(i) 10% to 100% by weight of one or more $C_1$-$C_{24}$-alkyl ester of acrylic and/or methacrylic acid,
(ii) 0% to 80% by weight of a water-insoluble or sparingly water-soluble bi- or polyfunctional monomer, and
(iii) 0% to 90% by weight of other monomers,
all based on the total weight of the monomers,
to produce microcapsules;
followed by
(b) adding to the microcapsules in an aqueous medium the polyelectrolyte, followed by isolating the microcapsules.

20. The method of claim 19, further comprising drying the microcapsules.

21. The method of claim 19, further comprising spray drying the microcapsules.

* * * * *